UNITED STATES PATENT OFFICE.

FREDERIC NEWTON GISBORNE, OF LONDON, ENGLAND.

IMPROVED COMPOSITION FOR COATING SHIPS' BOTTOMS.

Specification forming part of Letters Patent No. 45,212, dated November 22, 1864.

*To all whom it may concern:*

Be it known that I, FREDERIC NEWTON GISBORNE, of No. 3 Adelaide Place, London Bridge, in the city of London, engineer and electrician, have invented an Improved Composition for Coating Ships' Bottoms; and I hereby declare that the following is a full and exact description thereof.

The nature of my said invention and the manner in which the same is to be performed is as follows:

I use in the composition the following ingredients or their chemical equivalents, and in the proportions following, or nearly so, but the relative quantities may be varied more or less: Quicksilver or mercury, either as a nitrate of mercury or crude, but I prefer the latter, one pound; red lead, half a pound; litharge, half a pound; powdered flint glass or asphalt, a quarter of a pound; vermilion or Chinese red, a quarter of a pound, mixed together as a pigment with boiled linseed-oil.

The process of admixture I adopt is as follows, or nearly so: I pour a little oil on the quicksilver and rub it down for a few minutes, then gradually add the powdered glass or asphalt to aid the disintegration of the globules of the quicksilver. I mix the red lead and litharge dry first, and then add them to the quicksilver so prepared. I then add the vermilion or Chinese red with sufficient additional oil to form a composition about the ordinary consistency of paint or pigment prepared for use.

The composition is applied in the usual way, with two coatings; but the surface to which it is applied should be clean.

The quicksilver is the essential ingredient in the composition.

Having described the nature of my said invention and in what manner the same is to be performed, I wish it to be understood that what I claim as my invention is—

The composition substantially as hereinbefore described.

In witness whereof I, the said FREDERIC NEWTON GISBORNE, have hereunto set my hand this 31st day of May, 1864.

F. N. GISBORNE.

Witnesses:
    CHAS. ROBERTS,
*Clerk to Mr. H. Wickens, 4 Tokenhouse Yard Bank, London.*
    GEORGE H. WARREN,
*No. 17 Gracechurch Street, London, E. C.*
    JOHN HARRISON,
*Notary Public, London.*